United States Patent
Akiyama

(10) Patent No.: US 12,147,845 B2
(45) Date of Patent: Nov. 19, 2024

(54) VIRTUAL MACHINE MIGRATION BASED ON NETWORK USAGE

(71) Applicant: Nippon Telegraph and Telephone Corporation, Tokyo (JP)

(72) Inventor: Takayuki Akiyama, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 484 days.

(21) Appl. No.: 17/608,061

(22) PCT Filed: May 22, 2019

(86) PCT No.: PCT/JP2019/020304
§ 371 (c)(1),
(2) Date: Nov. 1, 2021

(87) PCT Pub. No.: WO2020/235055
PCT Pub. Date: Nov. 26, 2020

(65) Prior Publication Data
US 2022/0214926 A1 Jul. 7, 2022

(51) Int. Cl.
*G06F 9/50* (2006.01)
*G06F 9/455* (2018.01)
*H04L 41/0896* (2022.01)

(52) U.S. Cl.
CPC ........ *G06F 9/5077* (2013.01); *G06F 9/45558* (2013.01); *H04L 41/0896* (2013.01); *G06F 2009/4557* (2013.01)

(58) Field of Classification Search
CPC ............... G06F 9/5077; G06F 9/45558; G06F 2009/4557; H04L 41/0896
See application file for complete search history.

(56) References Cited

U.S. PATENT DOCUMENTS 8,321,862 B2 * 11/2012 Swamy ................ G06F 9/4856 718/1
2015/0007177 A1 1/2015 Tobo et al.

FOREIGN PATENT DOCUMENTS

JP 2012208541 10/2012
JP 2015007942 1/2015

OTHER PUBLICATIONS

VMware Inc., "DRS Performance—Vmware vSphere 6.5," Performance Study, Nov. 2016, retrieved from URL <https://www.vmware.com/content/dam/digitalmarketing/vmware/en/pdf/techpaper/drs-vsphere65-perf.pdf>, 27 pages.

* cited by examiner

*Primary Examiner* — Wissam Rashid
(74) *Attorney, Agent, or Firm* — Fish & Richardson P.C.

(57) ABSTRACT

A virtual machine monitoring device allows for securing a network band of a virtual machine in a virtualization infrastructure system. To achieve this, the virtual machine monitoring device includes: a data acquisition unit that collects hosts on which virtual machines operate, operation statuses of the virtual machines, and used network bands of the hosts; a monitoring unit that specifies, when the used network bands of the hosts exceed a predetermined network band threshold value, virtual machines that operate on the hosts and the operation statuses of which do not satisfy a predetermined reference; a migration determination unit that determines a virtual machine to be migrated among the specified virtual machines and determines a migration destination host; and a migration instruction unit that instructs the virtualization infrastructure control device to perform the migration.

15 Claims, 5 Drawing Sheets

Fig. 3

| ID | HOST | CORE NUMBER | NIC NUMBER | MEMORY | |
|---|---|---|---|---|---|
| VM310 | H210 | 4 | 1 | 256 | |
| ... | ... | ... | ... | ... | |

| | STORAGE | VLANID | MAC ADDRESS |
|---|---|---|---|
| | 3f00,16 | VL33 | 3f:4b:04:93:a8:01 |
| | ... | ... | ... |

Fig. 4

| ID | ACQUISITION TIME | BAND | TRANSMITTED PACKET | RECEIVED PACKET | |
|---|---|---|---|---|---|
| VM310 | 20190415-132356:600 | 2.3 | 91/63345 | 103/173934 | |
| ... | ... | ... | ... | ... | |

| | THROUGHPUT | DELAY |
|---|---|---|
| | 17247 | 23 |
| | ... | ... |

| 151 | 152 | 153 | 154 | 155 |
|---|---|---|---|---|
| ID | ACQUISITION TIME | BAND | TRANSMITTED PACKET | RECEIVED PACKET |
| H201 | 20190415-132356:600 | 4.3 | 184/128345 | 203/353934 |
| ... | ... | ... | ... | ... |

| 156 | 157 |
|---|---|
| THROUGHPUT | DELAY |
| 33507 | 23 |
| ... | ... |

VIRTUAL MACHINE MIGRATION BASED ON NETWORK USAGE

CROSS-REFERENCE TO RELATED APPLICATIONS

This application is a National Stage application under 35 U.S.C. § 371 of International Application No. PCT/JP2019/020304, having an International Filing Date of May 22, 2019. The disclosure of the prior application is considered part of the disclosure of this application, and is incorporated in its entirety into this application.

TECHNICAL FIELD

The present invention relates to a virtual machine monitoring device, a virtual machine monitoring method, and a program that perform virtual machine management in accordance with the usage status of a network.

BACKGROUND ART

It has become common to achieve an information service by using a virtualization infrastructure, not only for cloud business operators of infrastructure as a service (IaaS) or the like but also for users of information and communication technology (ICT) infrastructure such as enterprises, and it has been desired to provide the service at certain quality. To assure the service at certain quality, a virtual machine needs to secure a network band in addition to a central processing unit (CPU) and a memory necessary for service provision.

Conventionally, virtual machine disposition (allocation of a virtual machine to a host (physical machine or compute)) with taken into account the number of CPUs (the number of cores) and a memory size has been performed as virtual machine management. The network band of each virtual machine can be secured by setting the quality of service (QoS) in a virtualization infrastructure and restricting the network band of the disposed virtual machine. In a virtualization infrastructure management technology disclosed in Non-Patent Literature 1, when the usage rate of the CPU and the memory of a host exceeds a threshold value, load equalization is achieved by migrating (moving) a virtual machine to another host. The host to which the migration is performed is determined through consideration of the network band in addition to the CPU and the memory.

CITATION LIST

Non-Patent Literature

Non-Patent Literature 1: DRS PERFORMANCE—VMWARE vSPHERE 6.5, [online], [search on May 8, 2020], the Internet <URL:https://www.vmware.com/content/dam/digitalmarketing/vmware/en/pdf/techpaper/drs-vsphere65-perf.pdf>

SUMMARY OF THE INVENTION

Technical Problem

QoS setting in a virtualization infrastructure is manually performed at each generation or migration of a virtual machine and needs work in which an operator of the virtualization infrastructure determines and sets a set value. In the technology of Non-Patent Literature 1, a virtual machine is migrated when the usage rate of the CPU and the memory of a host exceeds a threshold value, but the usage rate (band) of a network is not considered. Thus, the network band used by a virtual machine increases and the network band of another virtual machine in the same environment is squeezed in some cases. When the network band is squeezed, delay occurs, a service response time increases, and service provision is interrupted.

The present invention has been made to solve the above-described problem and aims to provide a virtual machine monitoring device, a virtual machine monitoring method, and a program that allows for securing the network band of a virtual machine.

Means for Solving the Problem

To solve the above-described problem, an invention according to claim 1 is a virtual machine monitoring device that monitors virtual machines in a virtualization infrastructure system including a plurality of hosts on which the virtual machines operate and a virtualization infrastructure control device configured to control migration of the virtual machines from one of the hosts to another one of the hosts. The virtual machine monitoring device includes: a data acquisition unit configured to collect the hosts on which the virtual machines operate, operation statuses of the virtual machines, and network usage statuses of the hosts, the network usage statuses including a used network band; a monitoring unit configured to determine whether the used network bands of the hosts exceed a predetermined network band threshold value and specify, when the predetermined network band threshold value is exceeded, virtual machines that operate on the hosts and the operation statuses of which do not satisfy a predetermined reference; a migration determination unit configured to determine a virtual machine to be migrated among the virtual machines, the operation statuses of which do not satisfy the predetermined reference, and determine a migration destination host of the virtual machine to be migrated; and a migration instruction unit configured to instruct the virtualization infrastructure control device to migrate the virtual machine to be migrated to the migration destination host.

An invention according to claim 6 is a virtual machine monitoring method of a virtual machine monitoring device that monitors virtual machines in a virtualization infrastructure system including a plurality of hosts on which the virtual machines operate and a virtualization infrastructure control device configured to control migration of the virtual machines from one of the hosts to another one of the hosts. The virtual machine monitoring device executes: a step of collecting the hosts on which the virtual machines operate, operation statuses of the virtual machines, and network usage statuses of the hosts, the network usage statuses including a used network band; a step of determining whether the used network bands of the hosts exceed a predetermined network band threshold value and specifying, when the predetermined network band threshold value is exceeded, virtual machines that operate on the hosts and the operation statuses of which do not satisfy a predetermined reference; a step of determining a virtual machine to be migrated among the virtual machines, the operation statuses of which do not satisfy the predetermined reference, and determining a migration destination host of the virtual machine to be migrated; and a step of instructing the virtualization infrastructure control device to migrate the virtual machine to be migrated to the migration destination host.

With such a configuration, the virtual machine monitoring device specifies a virtual machine that operates on a host having a used network band exceeding the predetermined network band threshold value and the operation status of which does not satisfy the predetermined reference, and instructs the virtualization infrastructure control device to migrate the virtual machine to another host. Through the migration, the virtual machine can avoid network band squeeze on the host before the migration. Accordingly, the virtual machine can maintain the quality of a provided service.

An invention according to claim 2 is the virtual machine monitoring device according to claim 1, in which the predetermined reference includes at least one of a used network band calculated by a predetermined formula from a used network band of the virtual machine before the used network band of the host exceeds the predetermined network band threshold value, a packet loss rate calculated by a predetermined formula from a packet loss rate of the virtual machine before the used network band of the host exceeds the predetermined network band threshold value, a service request processing amount calculated by a predetermined formula from a service request processing amount of the virtual machine before the used network band of the host exceeds the predetermined network band threshold value, and a service response time calculated by a predetermined formula from a service response time of the virtual machine before the used network band of the host exceeds the predetermined network band threshold value.

With such a configuration, the virtual machine monitoring device can determine whether the operation status of a virtual machine satisfies the predetermined reference based on the packet loss rate, the service request processing amount, and the service response time as well as the used network band.

An invention according to claim 3 is the virtual machine monitoring device according to claim 1, in which the migration determination unit determines a host, as the migration destination host, from among the hosts, the host having a used network band not exceeding the predetermined network band threshold value even when the used network band is combined with a used network band of the virtual machine to be migrated before the used network band of a host on which the virtual machine to be migrated operates exceeds the predetermined network band threshold value.

With such a configuration, the virtual machine monitoring device migrates a virtual machine to a host that can secure a network band before squeeze starts. Accordingly, the virtual machine after the migration can provide a service with a secured network band.

An invention according to claim 4 is the virtual machine monitoring device according to claim 1, in which the migration determination unit determines, as the virtual machine to be migrated, any one of a virtual machine, the operation status of which does not satisfy the predetermined reference and a current used network band of which is maximum, and a virtual machine, the operation status of which does not satisfy the predetermined reference, the current used network band of which is larger than excess of the used network band of the host from the predetermined network band threshold value, and the current used network band of which is minimum.

With such a configuration, the virtual machine monitoring device can reduce the used network band of a host by migrating one virtual machine. Accordingly, a virtual machine can maintain the quality of a provided service while reducing loads on hosts and networks due to virtual machine migration.

An invention according to claim 5 is the virtual machine monitoring device according to claim 1, in which the migration determination unit determines the virtual machine to be migrated to be a plurality of virtual machines, the operation statuses of which do not satisfy the predetermined reference, a total amount of used network bands of which is larger than excess of the used network band of the host from the predetermined network band threshold value, and the number of which is minimum.

With such a configuration, the virtual machine monitoring device can eliminate excess of the used network band of the host while minimizing the number of migrated virtual machines. Accordingly, a virtual machine can maintain the quality of a provided service while reducing loads on hosts and networks due to virtual machine migration.

An invention according to claim 7 is a program for causing a computer to function as the virtual machine monitoring device according to claim 1.

With such a program, each function of the virtual machine monitoring device according to claim 1 can be achieved by using a typical computer.

Effects of the Invention

The present invention can provide a virtual machine monitoring device, a virtual machine monitoring method, and a program that allow for securing a network band of a virtual machine.

BRIEF DESCRIPTION OF DRAWINGS

FIG. 3 is a data configuration diagram of a virtual machine management database according to the present embodiment.

FIG. 4 is a data configuration diagram of a virtual machine communication statistics database according to the present embodiment.

DESCRIPTION OF EMBODIMENTS

The following describes a virtual machine monitoring device in a mode (embodiment) for carrying out the present invention. The virtual machine monitoring device according to the present embodiment monitors the statuses of network usage by hosts and virtual machines, specifies a virtual machine, the network band used by which is squeezed, and migrates the virtual machine to another host.

In this manner, the virtual machine monitoring device according to the present embodiment enables a virtual machine to avoid network band squeeze by another virtual machine in the same environment and secure a necessary network band. Accordingly, the virtual machine can ensure the quality of a service provided by the virtual machine. In the following, a virtualization infrastructure and a virtualization infrastructure system including a virtual machine monitoring device will be described in detail.

Configuration of Virtualization Infrastructure System

Figure 1:
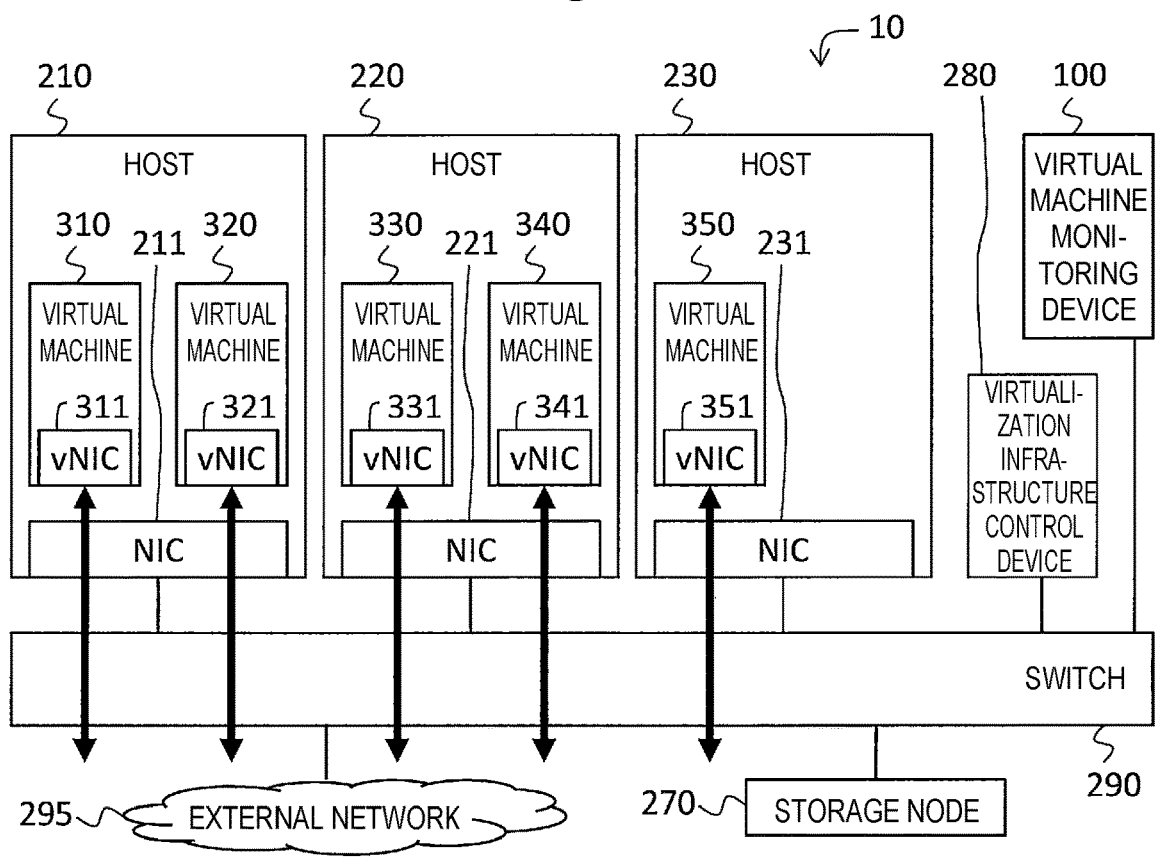
FIG. 1 is an entire configuration diagram of a virtualization infrastructure system including a virtual machine monitoring device according to the present embodiment.

FIG. 1 is an entire configuration diagram of a virtualization infrastructure system 10 including a virtual machine monitoring device 100 according to the present embodiment. The virtualization infrastructure system 10 includes hosts 210, 220, and 230, a storage node 270, a virtualization infrastructure control device 280, a switch 290, and the virtual machine monitoring device 100. The hosts 210, 220, and 230, the storage node 270, the virtualization infrastructure control device 280, and the virtual machine monitoring device 100 are connected with the switch 290 and can perform mutual communication. The switch 290 is connected with an external network 295.

The host 210 includes a network interface card (NIC) 211. Virtual machines 310 and 320 operate on the host 210 and provide a service to computers connected with the external network 295. Specifically, the virtual machine 310 includes a virtual NIC 311 (referred to as "vNIC" in FIG. 1) and provides a service through the NIC 211, the switch 290, and the external network 295. Similarly, virtual machines 320, 330, 340, and 350 include virtual NICs 321, 331, 341, and 351 and operate on the hosts 210, 220, 220, and 230, respectively. In FIG. 1, the number of hosts is three and the number of virtual machines on each host is one or two, but the present invention is not limited to this configuration. A plurality of hosts are included, and one or more virtual machines can operate on each host.

The virtual machines 310, 320, 330, 340, and 350 do not necessarily individually provide services. For example, the virtual machines 330, 340, and 350 may form one service as a whole through mutual communication and provide the service to a computer connected with the external network 295.

The storage node 270 is a storage device including a hard disk drive (HDD) or a solid state drive (SSD) and functions as a storage for the virtual machines 310, 320, 330, 340, and 350. Specifically, the virtual machines 310, 320, 330, 340, and 350 access to the storage node 270 as a shared local storage through the NICS 211, 221, and 231 and the switch 290. Thus, for example, when the virtual machine 320 is migrated from the host 210 to the host 230, the virtual machine 320 accesses to the storage node 270 as a local storage.

The virtualization infrastructure control device 280 controls the hosts 210, 220, and 230, the virtual machines 310, 320, 330, 340, and 350, and the switch 290 and stores information necessary for control. Control on a virtual machine includes host allocation, activation, termination, and migration. Control on the hosts 210, 220, and 230 and the switch 290 includes setting of virtual local area network (VLAN) connected with virtual machines. The virtualization infrastructure control device 280 stores, for example, the number of CPUs (the number of cores) and the memory size of each virtual machine, a host on which the virtual machine is operating, its allocated region of the storage node 270, and VLAN information.

Virtual Machine Monitoring Device: Functional Configuration

Figure 2:
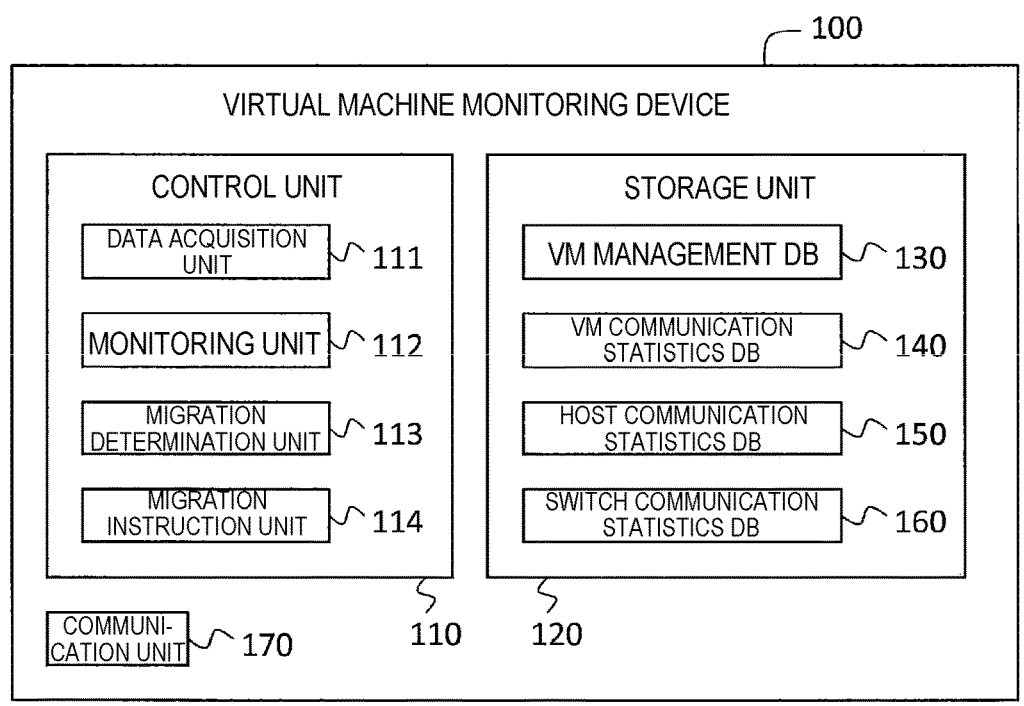
FIG. 2 is a functional configuration diagram of the virtual machine monitoring device according to the present embodiment.

FIG. 2 is a functional configuration diagram of the virtual machine monitoring device 100 according to the present embodiment. The virtual machine monitoring device 100 includes a control unit 110 achieved by a CPU, a storage unit 120 achieved by a random access memory (RAM), an SSD, or the like, and a communication unit 170. The communication unit 170 is achieved by an NIC and performs communication with the virtualization infrastructure control device 280 and the hosts 210, 220, and 230.

The storage unit 120 includes a virtual machine management database 130 (referred to as VM (virtual machine) management DB (database) in FIG. 2), a virtual machine communication statistics database 140, a host communication statistics database 150, and a switch communication statistics database 160. The switch communication statistics database 160 includes communication statistics information on the switch 290 and includes information such as the number of packets and the amount of data for each VLAN and the number of transmitted and received packets and the amount of data for each media access controller (MAC) address. In the following, the virtual machine management database 130, the virtual machine communication statistics database 140, and the host communication statistics database 150 will be described.

Virtual Machine Monitoring Device: Virtual Machine Management Database

FIG. 3 is a data configuration diagram of the virtual machine management database 130 according to the present embodiment. The virtual machine management database 130 is, for example, data in a table format, and one row (record) corresponds to one virtual machine. Each record in the virtual machine management database 130 includes identification information 131 (referred to as ID in FIG. 3), a host 132, a core number 133, a NIC number 134, a memory 135, a storage 136, VLAN identification information 137 (referred to as VLANID in FIG. 3), and a MAC address 138.

The identification information 131 is identification information of a virtual machine. The host 132 is identification information of a host on which each virtual machine operates. The core number 133 is the number of cores (the number of virtual CPUs) of the virtual machine. The NIC number 134 is the number of virtual NICs of the virtual machine. The memory 135 is the memory size of the virtual machine and has the unit of GB. The storage 136 indicates a region (the start address and size (in the unit of TB) of the region) allocated to the virtual machine in the storage node 270. The VLAN identification information 137 is identification information of a VLAN connected with each virtual NIC included in the virtual machine. The MAC address 138 is the MAC address of each virtual NIC included in the virtual machine.

Identification information of a virtual machine indicated by a record 139 is "VM310", and identification information of a host on which each virtual machine operates is "H210". The virtual machine indicated by the record 139 includes four cores, one virtual NIC, a memory of 256 GB, and a storage of 16 TB. The virtual NIC of the virtual machine indicated by the record 139 has the MAC address "3f:4b: 04:93: a8:01" and is connected with a VLAN having identification information of "VL33".

Virtual Machine Monitoring Device: Virtual Machine Communication Statistics Database FIG. 4 is a data configuration diagram of the virtual machine communication statistics database 140 according to the present embodiment. The virtual machine communication statistics database 140 is, for example, data in a table format, and one record indicates communication statistics information (operation status) of one virtual machine in a duration. Each record in the virtual machine communication statistics database 140 includes identification information 141, an acquisition time 142, a band 143, a transmitted packet 144, a received packet 145, a throughput 146, and a delay 147.

The identification information 141 is identification information of a virtual machine and corresponds to the identification information 131 in the virtual machine management database 130. The acquisition time 142 is a duration in which the communication statistics information is acquired. The band 143 is an average communication band in the acquisition time 142 and has the unit of Gbps. The transmitted packet 144 includes the number of transmitted packets and the number of lost transmitted packets in the acquisition time 142, and a packet loss rate in transmission can be calculated based on these values. The received packet 145 includes the number of received packets and the number of lost received packets in the acquisition time 142, and a packet loss rate in reception can be calculated based on these values.

The throughput 146 is the number of processed messages per unit time in the acquisition time 142. The virtual machine processes a request message included in a received packet and gives notification of a result of the processing as a response message included in a transmitted packet. The number of pairs of a transmitted packet and a received packet is the number of processed messages (service request processing amount). The delay 147 is the time duration of message processing, is the average value of a time duration until transmission of a response message since reception of each request message over the acquisition time 142, and has the unit of ms.

A record 149 indicates that, for a virtual machine having identification information of "VM310", the average communication band is 2.3 Gbps, the number of transmitted packets is 63345, the number of lost transmitted packets is 91, the number of received packets is 173934, the number of lost received packets is 103, the number of processed messages is 17247, and the delay is 23 ms in the duration of 600 seconds since 13:23:56 on Apr. 15, 2019.

Virtual Machine Monitoring Device: Host Communication Statistics Database

Figures 5, 6:
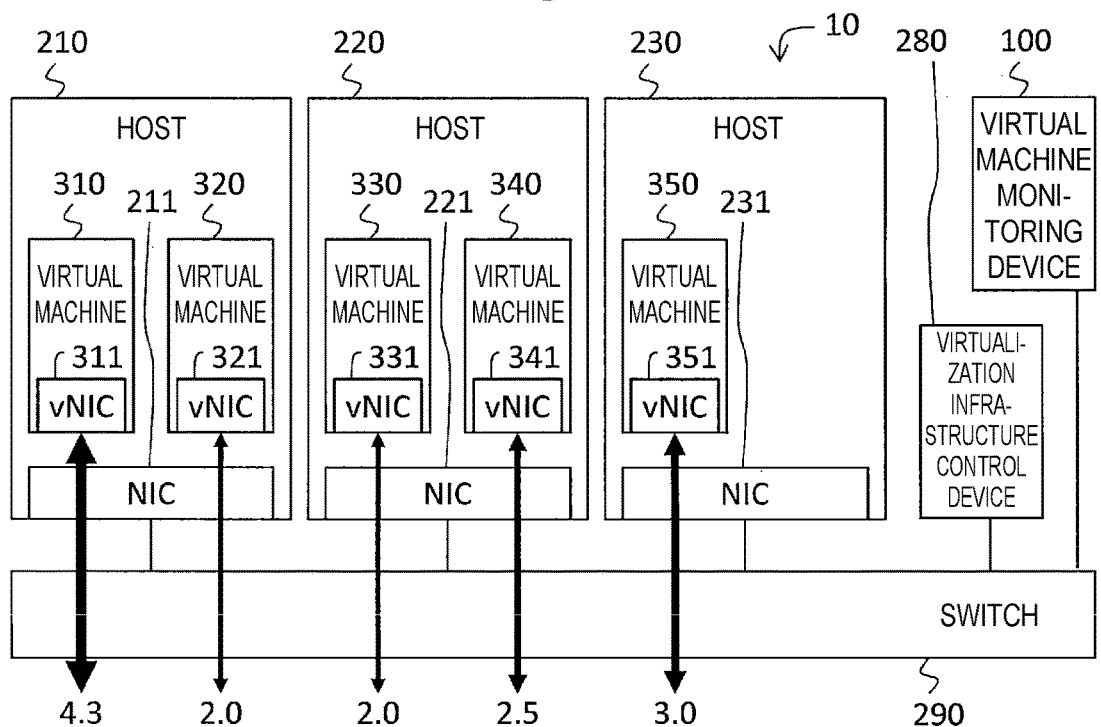
FIG. 5 is a data configuration diagram of a host communication statistics database according to the present embodiment.
FIG. 6 is a diagram for description of a network usage status in the virtualization infrastructure system according to the present embodiment in a normal state.

FIG. 5 is a data configuration diagram of the host communication statistics database 150 according to the present embodiment. The host communication statistics database 150 is, for example, data in a table format, and one record indicates communication statistics information (network usage status) of one host in a duration. Each record in the host communication statistics database 150 includes identification information 151, an acquisition time 152, a band 153, a transmitted packet 154, a received packet 155, a throughput 156, and a delay 157.

The identification information 151 is identification information of a host. The acquisition time 152, the band 153, the transmitted packet 154, and the received packet 155 are same as the acquisition time 142, the band 143, the transmitted packet 144, and the received packet 145, respectively, in the virtual machine communication statistics database 140, and is communication statistics information of the host, instead of a virtual machine. The throughput 156 and the delay 157 are a throughput (the number of processed messages per unit time) and a delay (average message processing time) of all virtual machines operating on the host in the acquisition time 152.

Virtual Machine Monitoring Device: Control Unit

The control unit 110 of the virtual machine monitoring device 100 will be described below with reference to FIG. 2. A data acquisition unit 111 acquires communication statistics information from the hosts 210, 220, and 230 and the switch 290 at predetermined timings (for example, in a constant period) and stores the communication statistics information in the virtual machine communication statistics database 140, the host communication statistics database 150, and the switch communication statistics database 160. The data acquisition unit 111 also acquires information of virtual machines operating on the hosts 210, 220, and 230 from the virtualization infrastructure control device 280 at predetermined timings (for example, at activation, stop, and migration of each virtual machine) and stores the information in the virtual machine management database 130.

A monitoring unit 112 searches communication statistics information stored in the virtual machine communication statistics database 140 and the host communication statistics database 150 for a host or virtual machine having large network usage. The monitoring unit 112 also searches for a virtual machine that exists in the same environment (operating on the same host) with a virtual machine having large network usage, and performance of which has deteriorated (the operation status of which does not satisfy a predetermined reference). Any virtual machines as a result of the search is a virtual machine candidate for migration to another host.

A migration determination unit 113 determines necessity of migration of a virtual machine that exists in the same environment with a virtual machine having large network usage, performance of which has deteriorated, and that is specified by the monitoring unit 112. The migration determination unit 113 also determines a host as the destination of the migration. A migration instruction unit 114 instructs the virtual machine migration determined by the migration determination unit 113 to the virtualization infrastructure control device 280.

Virtual Machine Monitoring Processing

Virtual machine monitoring processing executed by the monitoring unit 112, the migration determination unit 113, and the migration instruction unit 114 will be described below with reference to FIGS. 6 to 8.

FIG. 6 is a diagram for description of the network usage status in the virtualization infrastructure system 10 according to the present embodiment in a normal state. The storage node 270 is not illustrated. Bidirectional arrows having the virtual NICS 311, 321, 331, 343, and 351 at end points, and numbers below the arrows represent network bands (network usage or used network bands) used by the corresponding virtual machines 310, 320, 330, 340, and 350. In the normal state, the virtual machines 310, 320, 330, 340, and 350 use bands of 4.3 Gbps, 2.0 Gbps, 2.0 Gbps, 2.5 Gbps, and 3.0 Gbps, respectively.

Figure 7:
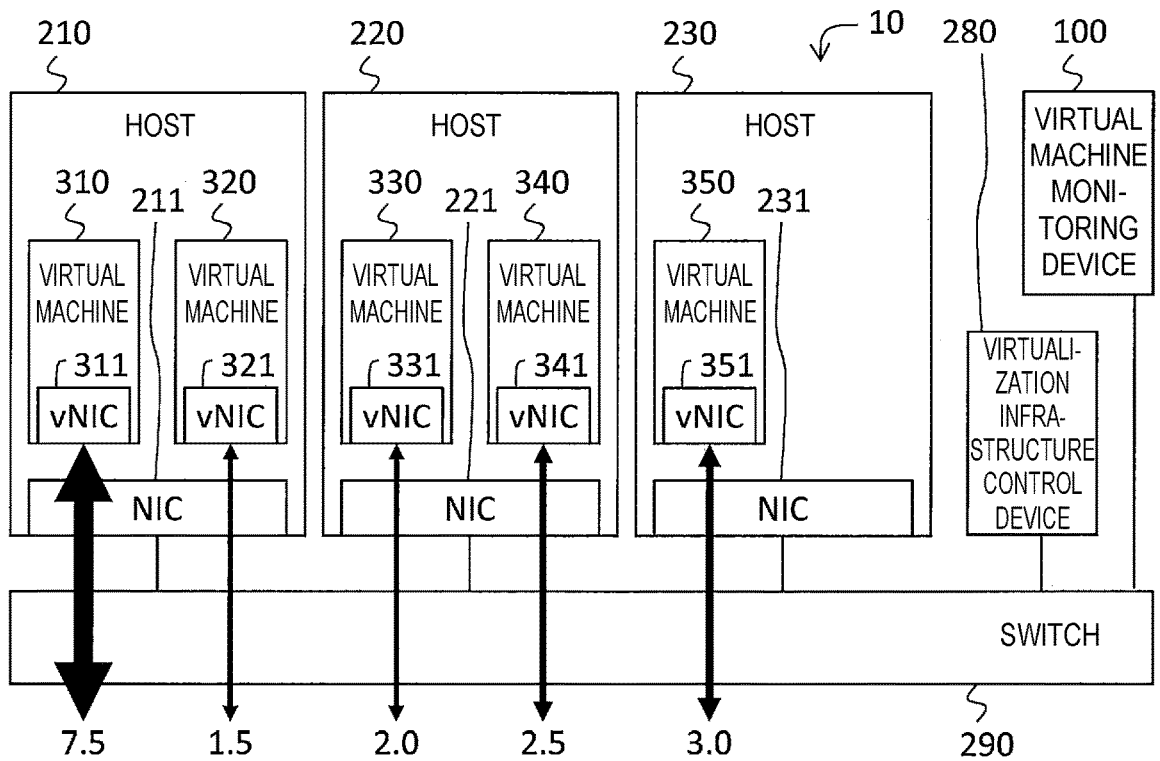
FIG. 7 is a diagram for description of the network usage status when a network usage of a virtual machine sharply increases in the virtualization infrastructure system according to the present embodiment.

FIG. 7 is a diagram for description of the network usage status when the network usage by the virtual machine 310 sharply increases in the virtualization infrastructure system 10 according to the present embodiment. The usage by the virtual machine 310 has increased from 4.3 Gbps to 7.5 Gbps as compared to the normal state illustrated in FIG. 6. The usage by the virtual machine 320 in the same environment with the virtual machine 310 is affected by the usage by the virtual machine 310 (band) and has decreased from 2.0 Gbps to 1.5 Gbps.

The monitoring unit 112 refers to communication statistics information stored in the virtual machine communication statistics database 140 and the host communication statistics database 150 and specifies the virtual machine 320, the network usage of which has decreased as described above. The migration determination unit 113 determines a host as the migration destination of the virtual machine 320 based on the CPU, memory, and network usage status of the host. In the state illustrated in FIG. 7, the migration determination unit 113 determines that the CPU, memory, and network of the host 230 have allowance, and determines the host 230 as the migration destination. Upon the determination by the migration determination unit 113, the migration instruction unit 114 instructs the virtualization infrastructure control device 280 to migrate the virtual machine 320 to the host 230.

Figure 8:
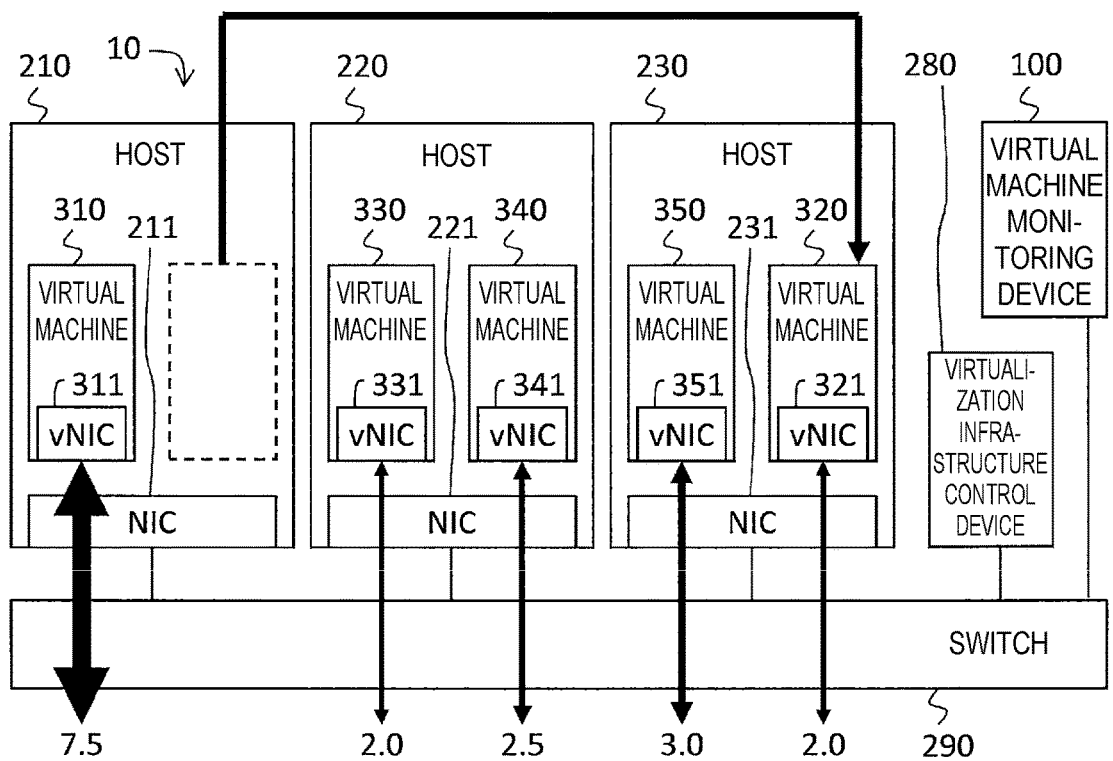
FIG. 8 is a diagram for description of the network usage status after migration of a virtual machine in the virtualization infrastructure system according to the present embodiment.

FIG. 8 is a diagram for description of the network usage status in the virtualization infrastructure system 10 according to the present embodiment after the migration of the virtual machine 310. The virtual machine 320 is migrated from the host 210 to the host 230 unlike the normal state illustrated in FIG. 6. The network usage of the virtual machine 320, which decreased to 1.5 Gbps (refer to FIG. 7) due to influence of the virtual machine 310, has returned to 2.0 Gbps in the normal state (refer to FIG. 6).

Figure 9:
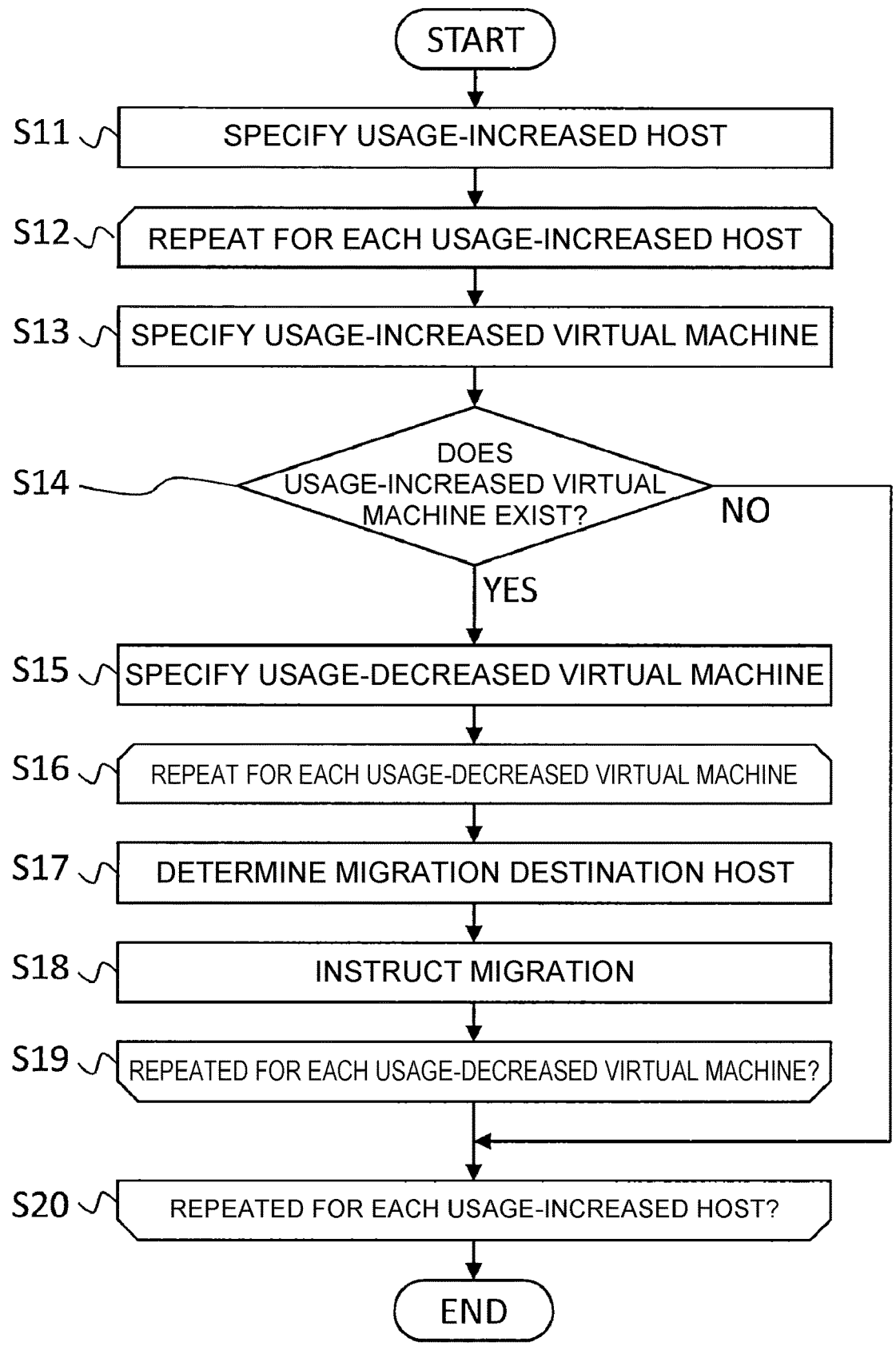
FIG. 9 is a flowchart of virtual machine monitoring processing according to the present embodiment.

Subsequently, the process of the virtual machine monitoring processing will be described below. FIG. 9 is a flowchart of the virtual machine monitoring processing according to the present embodiment. The virtual machine monitoring processing is executed at predetermined timings, for example, in a constant period. The virtual machine monitoring processing may be executed at update of the virtual machine communication statistics database 140 or the host communication statistics database 150.

At step S11, the monitoring unit 112 specifies any host, the network usage of which has increased. Specifically, the monitoring unit 112 searches the host communication statistics database 150 (refer to FIG. 5) for any host, the band 153 of the record of which in the latest acquisition time 152 exceeds a predetermined value (network band threshold value), and specifies the host as a usage-increased host. The predetermined value may be, for example, a constant value, may be a value obtained by multiplying an NIC maximum band of the host by a predetermined value, or may be a value obtained by multiplying the band average value of the host in a past predetermined duration by a predetermined value.

At step S12, the monitoring unit 112 repeats steps S13 to S19 for each usage-increased host specified at step S11.

At step S13, the monitoring unit 112 specifies a virtual machine that operates on the usage-increased host and the network usage of which has increased. Specifically, the monitoring unit 112 searches the virtual machine communication statistics database 140 (refer to FIG. 4) for any virtual machine that operates on the usage-increased host and the band 143 of the record of which in the latest acquisition time 142 exceeds a predetermined value, and specifies the virtual machine as a usage-increased virtual machine. A virtual machine operating on the usage-increased host can be specified by referring to the virtual machine management database 130 (refer to FIG. 3). The predetermined value may be, for example, a constant value, may be a value obtained by multiplying the NIC maximum band of the host by a predetermined value, or may be a value obtained by multiplying an average value of the network usage of the virtual machine in a past predetermined duration by a predetermined value.

At step S14, the monitoring unit 112 proceeds to step S15 when a usage-increased virtual machine is specified (exists) (YES at step S14) at step S13, or proceeds to step S20 when no usage-increased virtual machine is specified (exists) (NO at step S14).

At step S15, the monitoring unit 112 specifies a virtual machine that operates on the usage-increased host and the network usage of which has decreased. Specifically, the monitoring unit 112 searches the virtual machine communication statistics database 140 for any virtual machine that operates on the usage-increased host and the band 143 of the record of which in the latest acquisition time 142 is equal to or smaller than a predetermined value, and specifies the virtual machine as a usage-decreased virtual machine. The predetermined value is, for example, a value obtained by multiplying the band average value of the virtual machine in a past predetermined duration by a predetermined value.

At step S16, the monitoring unit 112 repeats steps S17 to S18 for each usage-decreased virtual machine specified at step S15.

At step S17, the migration determination unit 113 specifies a host as the migration destination of the usage-decreased virtual machine. Specifically, the migration determination unit 113 selects and determines a host as the migration destination from among hosts having spare capacity in the CPU, memory, and network usage thereof corresponding to the core, memory, and network usage of the usage-decreased virtual machine before the decrease in network usage. The core and memory of the usage-decreased virtual machine can be acquired from the virtual machine management database 130. The network usage before the decrease in usage can be acquired from the virtual machine communication statistics database 140. The spare capacity of the CPU and memory of the host can be acquired by querying the virtualization infrastructure control device 280. The spare capacity of the network usage of the host can be calculated based on the band 153 in the host communication statistics database 150 (refer to FIG. 5).

At step S18, the migration instruction unit 114 instructs the virtualization infrastructure control device 280 to migrate the usage-decreased virtual machine to the migration destination host determined at step S17.

At step S19, the monitoring unit 112 determines whether steps S17 to S18 have been repeated for each usage-decreased virtual machine specified at step S15. The monitoring unit 112 returns to step S17 when there is any unprocessed usage-decreased virtual machine, or proceeds to step S20 when there is no unprocessed usage-decreased virtual machine.

At step S20, the monitoring unit 112 determines whether steps S13 to S19 has been repeated for each usage-increased host specified at step S11. The monitoring unit 112 returns to step S13 when there is any unprocessed usage-increased host, or ends the virtual machine monitoring processing when there is no unprocessed usage-increased host.

Characteristics of Virtual Machine Monitoring Processing

The monitoring unit 112 determines whether a virtual machine, the network usage of which has increased, exists among virtual machines operating on a host, the network usage of which has increased. When such a virtual machine exists, the monitoring unit 112 specifies a virtual machine, the network usage of which has decreased at the host. Subsequently, the migration determination unit 113 determines the migration destination host of the virtual machine. Subsequently, the migration instruction unit 114 instructs the virtualization infrastructure control device 280 to migrate the virtual machine to the migration destination host.

Through migration to a host having spare capacity, a virtual machine, the network usage of which has decreased, can use a network having usage before the decrease in usage, and thus service quality can be recovered. In addition, spare capacity becomes available in the network usage of a host as the migration origin, and allowance occurs to the network usage of any virtual machine operating on this host. Accordingly, performance of each virtual machine operating in the virtualization infrastructure system 10 improves.

Modification 1: Usage-Decreased Virtual Machine

At step S15 in FIG. 9, the monitoring unit 112 specifies a virtual machine, the usage of which has decreased by referring to the band 143 (refer to FIG. 4) of the virtual machine. For example, the monitoring unit 112 sets a predetermined reference to be a value obtained by multiplying the average value of the band 143 of the virtual machine in a past predetermined duration by a predetermined value (calculated by a predetermined formula). When the latest band 143 is smaller than the predetermined reference, the monitoring unit 112 specifies the virtual machine as a virtual machine, the usage of which has decreased. Alternatively, the monitoring unit 112 may set a predetermined reference to be a value predetermined for each virtual machine and compare the predetermined reference with the latest band 143.

The monitoring unit 112 may refer to the transmitted packet 144 (packet loss rate) instead of the band 143. Specifically, the monitoring unit 112 may specify a virtual machine, performance of which has deteriorated, as a usage-decreased virtual machine by comparing the transmitted packet 144 with, as a predetermined reference, a value obtained by multiplying the average value of the transmitted packet 144 in a past predetermined duration by a predetermined value (value calculated by a predetermined formula) or a value determined in advance for each virtual machine. This is same for the received packet 145 (packet loss rate), the throughput 146 (service request processing amount), and the delay 147 (service response time). Alternatively, the monitoring unit 112 may combine these values to specify a usage-decreased virtual machine.

A usage-decreased virtual machine can be more accurately specified by performing determination based on a large number of statistical values. For example, when the number of received packets included in the received packet 145 and the band 143 have both decreased, it may be regarded that not network band squeeze but decrease of the amount of communication (the number of requests to a service) has occurred, thereby avoiding determination as decrease in usage.

Modification 2: Selection of Virtual Machine to be Migrated

At step S17, the migration determination unit 113 determines the migration destinations of all usage-decreased virtual machines, but only some usage-decreased virtual machines may be migrated. For example, the migration determination unit 113 may migrate one most degraded virtual machine. Alternatively, the migration determination unit 113 may migrate a virtual machine having maximum network usage among degraded virtual machines.

Alternatively, the migration determination unit 113 may migrate, among degraded virtual machines, a virtual machine having minimum network usage equal to or larger than excess of the network usage of the host. Alternatively, the migration determination unit 113 may migrate each virtual machine having network usage equal to or larger than excess of the network usage of the host so that the number of migrated virtual machines is minimum. When the number of migrated virtual machines is reduced, loads on hosts and the switch 290 can be reduced. Moreover, it is thought that a host having small network usage has a small processing amount and a small amount of memory in use, and migration cost can be reduced.

Modification 3: Usage-Increased Virtual Machine

At steps S13 and S14 in FIG. 9, when a usage-increased virtual machine exists, the monitoring unit 112 specifies the usage-decreased virtual machine at step S15. However, steps S13 to S14 may be omitted, and a virtual machine, the network usage of which has decreased at a host having an increased network usage, may be specified and migrated while no usage-increased virtual machine is specified.

Other Modifications

The present invention is not limited to the above-described embodiment but may be changed without departing from the scope of the invention. For example, a virtual machine to be migrated is determined by the migration determination unit 113 in Modification 2, but may be determined by the monitoring unit 112 at step S15 (refer to FIG. 9). Moreover, at step S17, the migration determination unit 113 acquires spare capacity of the CPU and memory of a host by querying the virtualization infrastructure control device 280. Instead, the data acquisition unit 111 may acquire the spare capacity from the virtualization infrastructure control device 280 at a predetermined timing and store the spare capacity in the storage unit 120, and the migration determination unit 113 may refer to the stored spare capacity of the CPU and memory.

Another embodiment may be a program for causing a computer to function as the virtual machine monitoring device 100, may be a storage medium in which the program is stored, or may be a server that distributes the program.

Although embodiments of the present invention are described above, these embodiments are merely exemplary and do not limit the technical scope of the present invention. The present invention may be achieved in other various embodiments and also provided with various kinds of changes such as omission and replacement without departing from the scope of the present invention. These embodiments and modifications are included in the range and scope of the invention described in the present specification and the like and are also included in the invention described in the claims and its equivalents.

REFERENCE SIGNS LIST 10 virtualization infrastructure system
100 virtual machine monitoring device
110 control unit
111 data acquisition unit
112 monitoring unit
113 migration determination unit
114 migration instruction unit
130 virtual machine management database
140 virtual machine communication statistics database
143 band (used network band of virtual machine)
144 transmitted packet (transmitted packet loss rate, packet loss rate)
145 received packet (received packet loss rate, packet loss rate)
146 throughput (service request processing amount)
147 delay (service response time)
150 host communication statistics database
153 band (used network band of host)
160 switch communication statistics database
210, 220, 230 host
280 virtualization infrastructure control device
310, 320, 330, 340, 350 virtual machine

The invention claimed is:

1. A virtual machine monitoring device comprising:
a data acquisition unit, including one or more processors, configured to collect [the]] hosts on which virtual machines operate in a virtualization infrastructure system, operation statuses of the virtual machines, and network usage statuses of the hosts, the network usage statuses including a used network band;
a monitoring unit, including one or more processors, configured to determine whether the used network bands of the hosts exceed a predetermined network band threshold value and specify, when the predetermined network band threshold value is exceeded, virtual machines that operate on the hosts and the operation statuses of which do not satisfy a predetermined reference, wherein the predetermined reference is based on a packet loss rate calculated by a predetermined formula from a packet loss rate of a virtual machine before the used network band of a host exceeds the predetermined network band threshold value;
a migration determination unit, including one or more processors, configured to determine a virtual machine to be migrated among the virtual machines, the operation statuses of which do not satisfy the predetermined reference, and determine a migration destination host of the virtual machine to be migrated; and
a migration instruction unit, including one or more processors, configured to instruct a virtualization infrastructure control device in the virtualization infrastructure system to migrate the virtual machine to be migrated to the migration destination host.

2. The virtual machine monitoring device according to claim 1, wherein, the predetermined reference includes at least one of:
a used network band calculated by a predetermined formula from a used network band of the virtual machine before the used network band of the host exceeds the predetermined network band threshold value;
a service request processing amount calculated by a predetermined formula from a service request processing amount of the virtual machine before the used network band of the host exceeds the predetermined network band threshold value; and
a service response time calculated by a predetermined formula from a service response time of the virtual machine before the used network band of the host exceeds the predetermined network band threshold value.

3. The virtual machine monitoring device according to claim 1, wherein the migration determination unit is configured to determine a host, as the migration destination host, from among the hosts, the host having a used network band not exceeding the predetermined network band threshold value even when the used network band is combined with a used network band of the virtual machine to be migrated before the used network band of a host on which the virtual machine to be migrated operates exceeds the predetermined network band threshold value.

4. The virtual machine monitoring device according to claim 1, wherein the migration determination unit is configured to;
determine the virtual machine to be migrated, wherein the operation status of the virtual machine does not satisfy the predetermined reference and a current used network band of which satisfies a threshold value; and
determine another virtual machine, wherein the operation status of the other virtual machine does not satisfy the predetermined reference, and the current used network band of which does not satisfy the threshold value.

5. The virtual machine monitoring device according to claim 1, wherein the migration determination unit is configured to determine the virtual machine to be migrated to be a plurality of virtual machines, the operation statuses of which do not satisfy the predetermined reference, a total amount of used network bands of which is larger than excess of the used network band of the host from the predetermined network band threshold value, and a number of which does not satisfy a threshold value.

6. A virtual machine monitoring method performed by a virtual machine monitoring device, the virtual machine monitoring method comprising:
collecting hosts on which virtual machines operate in a virtualization infrastructure system, operation statuses of the virtual machines, and network usage statuses of the hosts, the network usage statuses including a used network band;
determining whether the used network bands of the hosts exceed a predetermined network band threshold value and specifying, when the predetermined network band threshold value is exceeded, virtual machines that operate on the hosts and the operation statuses of which do not satisfy a predetermined reference, wherein the predetermined reference is based on a packet loss rate calculated by a predetermined formula from a packet loss rate of a virtual machine before the used network band of a host exceeds the predetermined network band threshold value;
determining a virtual machine to be migrated among the virtual machines, the operation statuses of which do not satisfy the predetermined reference, and determining a migration destination host of the virtual machine to be migrated; and instructing a virtualization infrastructure control device in the virtualization infrastructure system to migrate the virtual machine to be migrated to the migration destination host.

7. A non-transitory computer-readable medium storing software comprising instructions executable by one or more computers which, upon such execution, cause the one or more computers to perform operations comprising:
    collecting hosts on which virtual machines operate in a virtualization infrastructure system, operation statuses of the virtual machines, and network usage statuses of the hosts, the network usage statuses including a used network band;
    determining whether the used network bands of the hosts exceed a predetermined network band threshold value and specifying, when the predetermined network band threshold value is exceeded, virtual machines that operate on the hosts and the operation statuses of which do not satisfy a predetermined reference, wherein the predetermined reference is based on a packet loss rate calculated by a predetermined formula from a packet loss rate of a virtual machine before the used network band of a host exceeds the predetermined network band threshold value;
    determining a virtual machine to be migrated among the virtual machines, the operation statuses of which do not satisfy the predetermined reference, and determining a migration destination host of the virtual machine to be migrated; and
    instructing a virtualization infrastructure control device in the virtualization infrastructure system to migrate the virtual machine to be migrated to the migration destination host.

8. The virtual machine monitoring method according to claim 6, wherein, the predetermined reference includes at least one of:
    a used network band calculated by a predetermined formula from a used network band of the virtual machine before the used network band of the host exceeds the predetermined network band threshold value;
    a service request processing amount calculated by a predetermined formula from a service request processing amount of the virtual machine before the used network band of the host exceeds the predetermined network band threshold value; and
    a service response time calculated by a predetermined formula from a service response time of the virtual machine before the used network band of the host exceeds the predetermined network band threshold value.

9. The virtual machine monitoring method according to claim 6, further comprising:
    determining a host, as the migration destination host, from among the hosts, the host having a used network band not exceeding the predetermined network band threshold value even when the used network band is combined with a used network band of the virtual machine to be migrated before the used network band of a host on which the virtual machine to be migrated operates exceeds the predetermined network band threshold value.

10. The virtual machine monitoring method according to claim 6, further comprising:
    determining the virtual machine to be migrated, wherein the operation status of the virtual machine does not satisfy the predetermined reference and a current used network band of which satisfies a threshold value; and
    determining another virtual machine, wherein the operation status of the other virtual machine does not satisfy the predetermined reference, and the current used network band of which does not satisfy the threshold value.

11. The virtual machine monitoring method according to claim 6, further comprising:
    determining the virtual machine to be migrated to be a plurality of virtual machines, the operation statuses of which do not satisfy the predetermined reference, a total amount of used network bands of which is larger than excess of the used network band of the host from the predetermined network band threshold value, and a number of which does not satisfy a threshold value.

12. The non-transitory computer readable medium according to claim 7, wherein, the predetermined reference includes at least one of:
    a used network band calculated by a predetermined formula from a used network band of the virtual machine before the used network band of the host exceeds the predetermined network band threshold value;
    a service request processing amount calculated by a predetermined formula from a service request processing amount of the virtual machine before the used network band of the host exceeds the predetermined network band threshold value; and
    a service response time calculated by a predetermined formula from a service response time of the virtual machine before the used network band of the host exceeds the predetermined network band threshold value.

13. The non-transitory computer readable medium according to claim 7, further comprising:
    determining a host, as the migration destination host, from among the hosts, the host having a used network band not exceeding the predetermined network band threshold value even when the used network band is combined with a used network band of the virtual machine to be migrated before the used network band of a host on which the virtual machine to be migrated operates exceeds the predetermined network band threshold value.

14. The non-transitory computer readable medium according to claim 7, further comprising:
    determining the virtual machine to be migrated, wherein the operation status of the virtual machine does not satisfy the predetermined reference and a current used network band of which satisfies a threshold value; and
    determining another virtual machine, wherein the operation status of the other virtual machine does not satisfy the predetermined reference, and the current used network band of which does not satisfy the threshold value.

15. The non-transitory computer readable medium according to claim 7, further comprising:
    determining the virtual machine to be migrated to be a plurality of virtual machines, the operation statuses of which do not satisfy the predetermined reference, a total amount of used network bands of which is larger than excess of the used network band of the host from the predetermined network band threshold value, and a number of which does not satisfy a threshold value.

* * * * *